Patented Feb. 4, 1941

2,230,359

UNITED STATES PATENT OFFICE 2,230,359

RUBBER DERIVATIVE AND PREPARATION THEREOF

James P. McKenzie, Calumet City, Ill., assignor to Marbon Corporation, Gary, Ind., a corporation of Delaware No Drawing. Application December 20, 1937, Serial No. 180,833

17 Claims. (Cl. 260—768)

This invention relates to rubber derivatives, and more particularly to rubber conversion products formed by the action on rubber of isomerizing or condensing agents. The invention more especially relates to improvements in the preparation of condensation derivatives of rubber formed by the action on rubber of phenols with auxiliary isomerizing agents such as acids and substances capable of liberating acids.

An object of the invention is to provide a simple and economical method for the manufacture of rubber derivatives.

A further object is to provide a substantially clear and colorless condensation derivative of rubber.

Another object of this invention is to provide a condensation derivative of rubber which is more soluble than condensation derivatives of equivalent clarity and coloration which have hitherto been produced.

A further object is to provide a method for obtaining substantially colorless, thermoplastic, resin-like, gasoline soluble rubber condensation derivative by a process involving the use of rubber and a phenol, and without the use of rubber solutions.

Another object is to provide a resin-like condensation derivative of rubber which is readily soluble in low boiling petroleum distillates without the necessity of milling the rubber derivative.

Other objects will become apparent as the following detailed description progresses.

In accordance with my invention, I react rubber in a liquid medium which is a non-solvent for rubber and which is present in sufficient amount so that separate phases of undissolved rubber and liquid medium are present during the reaction. Preferably the liquid medium which I use is also a solvent for the reaction product at the reaction temperature and is present in sufficient amount so that when the rubber is completely converted there is present a readily flowing solution of the rubber derivative in the liquid medium at the temperature of the reaction.

Thus, in the practice of one embodiment of my invention, I react undissolved rubber with a phenol and an acid at an elevated temperature, the phenol being in the liquid state at the temperature of the reaction and completely covering the rubber. As the reaction progresses, the rubber diminishes in amount and the rubber derivative, as it forms, dissolves in the liquid phenol. At the end of the reaction, the rubber derivative is completely dissolved in the hot phenol, forming a readily flowable solution. On cooling this solution to room temperature, it solidifies into a hard, brittle resin-like material similar to a solid solution which is easily ground to a fine powder, from which the phenol can readily be removed by washing with methanol or other solvent for the phenol and non-solvent for the rubber derivative.

The following examples are given to illustrate my invention:

EXAMPLE 1

The following is an example of commercial preparation: 40 pounds of cresol and 27 pounds of pale crepe rubber are mixed together in a suitable reaction vessel, such as a nickel container. Hydrogen chloride is then passed into the mixture until the cresol is saturated with the hydrogen chloride. The rubber also absorbs a small amount of hydrogen chloride. A suitable cover is then placed on the reactor and the mixture agitated. The mixture is heated by means of an oil bath, the oil being at 200 to 205° C. After three or four hours, the temperature of the reactants reaches about 190° C. This temperature is maintained for about one-half hour longer. The product, which is now a uniform liquid phase, is then poured into a flat container and allowed to cool. At room temperature it becomes a hard, translucent, brittle, resin-like mass which is easily ground to a fine powder. After grinding, the powder is washed with methanol to remove the cresol. After all the cresol and acid is removed, the material is dried. The process yields a homogeneous, white, thermoplastic, resin-like material having almost exactly the same weight as the original rubber. This thermoplastic, resin-like material has the same empirical formula as rubber, i. e. $(C_5H_8)x$, and is therefore a rubber isomer in the broad sense of the term. It is less unsaturated than rubber, and evidently a combination between carbon atoms has taken place. The product may therefore be called a rubber condensation derivative. According to another viewpoint, it is a cyclic rubber. It dissolves in common rubber solvents such as benzol, xylol, toluol, gasoline, turpentine, carbon tetrachloride and carbon bisulphide, and gives colloidal solutions a lower viscosity than rubber. Moreover, milling is not necessary to make the product readily soluble. It is further characterized by being a hard, resin-like, relatively non-tacky product at room temperature. It softens at about 80° C. and readily flows under pressure at 115° C. In thin sheet form or in solution in colorless solvents, it is clear and substantially colorless. The following table compares it with the well-known condensation derivative of rubber, Pliolite resin. This resin is typical of the condensation derivatives of rubber obtained by the process described in Endres Patent No. 2,052,391. According to tests, this Pliolite resin is more soluble and lighter in color than the products described in Fisher Patent No. 1,852,294.

*Comparison of end resin of Example 1 and pliolite resin*

A. Solubility—

| Solvent | Unmilled Ex. 1 end resin | Unmilled pliolite resin | Milled pliolite resin |
| --- | --- | --- | --- |
| Skellysolve F | P. S. | Sw | P. S. |
| Skellysolve C | S | PS | S |
| Skellysolve D | S | PS | S |
| Skellysolve L | S | PS | S |
| Solvesso #2 | S | S (milky) | S |
| Toluene | S | S (milky) | S |
| Cyclohexane | S | PS | S |
| Gasoline | S | S | S |
| Mineral oil (white, medium viscosity obtained from Standard Oil of Indiana) | S | SS | I |
| Chloroform | S | S (milky) | S |
| Carbon tetrachloride | S | S (milky) | S |
| Ethylene dichloride | Sw | Sw | Sw |
| Trichloroethylene | S | S (milky) | S |
| Tetrachlorethane | S | S | S |
| Propylene dichloride | S | S | SR |
| Carbon disulfide | S | S | S |

Code:
S......soluble
Sw....swells
PS....partially soluble
SR....slight residue
I......insoluble
SS....slightly soluble It will be noted that milled pliolite resin is less soluble in mineral oil than unmilled pliolite resin. This was also found to be true of milled Ex. 1 end resin. It is probably due to the fact that there is sufficient oxidation of the product on the mill to make it insoluble in a solvent such as mineral oil.

Description of the skellysolves:
F..Essentially pentanes-hexanes fraction
    Boiling range _____ 30° C.–60° C.
C..Essentially normal heptane fraction
    Boiling range _____ 86° C.–100° C.
D..Essentially mixed heptane fraction
    Boiling range _____ 77° C.–115° C.
L..Heavy lacquer diluent
    Boiling range _____ 80° C.–122° C B. Viscosity of solutions—
The viscosities of 15% solutions in toluene run in a #4 Ford cup at 21° C. are given below.

| Ex. 1 end resin | Pliolite resin | Milled pliolite resin |
| --- | --- | --- |
| Seconds 15.3 | Seconds 62.8 | Seconds 13.4 |

C. Color—
Ex. 1 end resin: Transparent almost water white in molded sheets .045" thick.
Pliolite resin: Somewhat darker than Ex. 1 end resin, and slightly hazy in molded sheet .045" thick.
Milled pliolite resin: Much darker but more transparent than the unmilled pliolite in molded sheet of same thickness. Not as transparent as Ex. 1 end resin.

EXAMPLE 2

To 300 grams of cresol is added 16 g. of aluminum chloride. The mixture is agitated and 200 g. of pale crepe rubber is added. The flask is then heated in an oil bath at approximately 200° C. As the temperature of the reaction mixture increases to the temperature of the oil bath, the rubber reacts rapidly and the resulting product goes into the solution. There is a distinct orange color produced. By the time the reaction is complete the temperature of the reactants has reached about 185° C. The resultant liquid phase has a much lower viscosity than that obtained by the use of hydrogen chloride. However, like the product of Example 1, when the hot solution is poured into a container and allowed to cool the composition solidifies. This solidified product is of a grainy nature and disintegrates when stirred with methanol. On remelting the product and pouring it into excess methanol, most of the product precipitates as a fine white powder but part remains in the form of small fibrous pieces. Solutions of the product are slightly darker and of less viscosity than solutions of products obtained with hydrogen chloride.

EXAMPLE 3

To 300 grams of cresol is added 20 g. of stannic chloride and the mixture agitated. 200 g. of pale crepe rubber is then added and the flask and contents heated in the same manner as described in the previous examples. The final product is somewhat darker and slightly more brittle and less granular than that obtained in Example 2. Furthermore, the solutions are of less viscosity.

It will be noted that the rubber used in the above example is pale crepe, and that it is not milled prior to reaction. This is the preferred type of rubber. The reactions, however, may be carried out with other types of rubber. If milled rubber or smoked sheet rubber are used, it is advantageous that they be sheeted out thin or pulverized so that considerable surface of rubber is exposed. I have discovered that when sheets of nonporous rubber of over $\frac{1}{16}$ inch in thickness are used the reaction is very slow and the time required to obtain a uniform product is long. In these cases, the resulting product is apt to be soft and tacky, rather than hard and brittle, as is the case when thin sheets such as pale crepe rubber are used.

Other isomerizing agents than those given in the examples may be used in my process. Isomerization agents for rubber are well known and are described in many patents and other publications. However, I prefer to carry out my process by reacting rubber with phenol in the presence of a mineral acid, which may be sup. directly or through a substance which will liberate the acid. Examples of suitable acids are hydrochloric acid and sulfuric acid.

I have found that other phenols than cresol may be employed in my process. For example, phenol carvacrol, alpha naphthol, beta naphthol, catechol and parachloro phenol are operative. It is not necessary to use pure phenols. Commercial cresol, which is a mixture of cresols, gives satisfactory results. Also cresylic acids are suitable. It is not necessary that a phenol compound be used which is liquid at room temperature, although it is preferable that the phenol compound be a liquid at the temperature of the reaction. However, phenol compounds which are liquid at room temperature are more satisfactory, as they are easy to handle and can be more readily saturated with hydrogen chloride.

The proportions of phenol to rubber may be varied quite widely. Moreover, the phenol may be diluted with other liquids. However, an important feature of this invention is having the liquid medium present in sufficient amount with solid rubber so that there are present separate phases of undissolved rubber and liquid medium, the liquid medium surrounding and covering the undissolved rubber. When a phenol is the sole liquid medium, I prefer to have the phenol present in quantities at least equal to that of the rubber. With 75 parts of cresol to 100 parts of rubber, solutions of the rubber condensation derivative in the cresol are quite viscous at the final reaction temperature and do not pour easily. Aside from this, however, the proportion of 75 parts of a phenol to 100 parts of rubber gives satisfactory results, but it may be considered as the lower limit for practical purposes.

The use of diluents with the phenol slow up the reaction and tend to form a soft non-uniform product. Therefore, I prefer to carry out my process with undiluted phenol. However, I do not limit myself to undiluted phenol. When diluents are used they should preferably be high boiling liquids which are readily miscible with the phenol and should not dissolve the rubber. When a rubber solvent, as for example, xylol is used, it should not be present in such amount that it will cause the solution of the rubber.

The temperature to which the mixture of rubber and liquid medium is heated is preferably above 125° C. and it will generally be found to be advantageous to raise the temperature of the reactants to about 190° C. However, the temperatures may be varied to a considerable extent. By increasing the time of the reaction, it is possible to use lower temperatures. Moreover, considerably higher temperatures than those given in the examples may be used.

Various methods of isolating the rubber condensation derivative from the solid resin-like reaction mass containing the phenol may be used. The extraction of the phenol from the ground mass by means of methanol, which is a solvent for the phenol and not for the condensation derivative, gives good results. However, it is also possible to carry out a water extraction when phenol (carbolic acid) is used. Another method which may be used is distillation. This may be either vacuum or steam distillation. Moreover, centrifuging of the ground or crushed mixture of undissolved rubber derivative and liquid phenol is a suitable method of separation of the phenol from the rubber derivative.

The condensation products made in accordance with the above described processes have many valuable uses. Since they are soluble in inexpensive volatile rubber solvents, including gasoline and naphtha, solutions have been found valuable for the preparation of paints, inks, and adhesive cements. In the preparation of adhesives my product may be coated on paper or fabric, and the solvent evaporated, leaving a film of the product. The paper or fabric containing this film may be used for various laminating purposes, as for example, it may be applied to some other material such as wood, metal or upholstery and adhered to this material by the application of heat and pressure.

The condensation products of this application are also useful in the production of molded articles of manufacture.

In the film form, the condensation products of this application, when suitably plasticized, are useful as wrapping sheets.

The condensation products of this application may be mixed with various other ingredients such as resins and waxes. It may be readily plasticized with soft cumarone resins, chlorinated diphenyls, or mineral oil, and the like. The material is miscible in high proportions with paraffin wax. These wax compositions are highly valuable as moisture proof coatings for paper and Cellophane.

My process gives many advantages, not only from the viewpoint of economy of operation, but from the point of view of quality of the product. It will be noted that milling of the rubber and milling of the reaction product is not necessary. The reaction takes place quickly and smoothly at atmospheric pressure with unmilled solid rubber. The reaction product is completely and uniformly reacted. Furthermore, it is easily isolated. Moreover, the phenol rubber conversion product resulting from my process appears to be more soluble in low boiling petroleum distillates than the product obtained from solid or undissolved rubber containing small amounts of dispersed phenol, and less tacky and lighter in color than the usual product obtained from mixtures of rubber solvents and phenol.

I do not desire to limit myself to any particular theory as to the mechanism of the reaction. However, I believe that some of the advantages are due in part to the fact that fresh surfaces of undissolved rubber are continuously exposed to the action of the reagents during the reaction at high temperatures, but at the same time these surfaces are not exposed to the action of oxygen.

It will be obvious that various modifications and proportions of the ingredients specified in the examples and in the time and temperature of carrying out the conversion reaction may be employed without departing from the principles of this invention, and therefore I do not desire wholly to limit the appended claims except as may be necessitated by the prior art.

Having thus described my invention, what I desire to secure by Letters Patent is:

1. The process of producing a rubber conversion product which comprises reacting substantially unmilled undissolved rubber at above 125° C. in liquid cresol in the presence of hydrogen chloride, the cresol being present in at least approximately 75 parts by weight to 100 parts by weight of rubber.

2. The method of producing a rubber conversion product which comprises mixing together undissolved rubber and a phenol to form a visibly heterogeneous mixture, and subjecting the mixture to heat in the presence of an acidifying isomerizing agent at a temperature such that the phenol is in the liquid state, the proportion of phenol to rubber being at least 75 parts by weight to 100 parts by weight and such that a substantial quantity of unabsorbed phenol exists in the liquid state in contact with the undissolved rubber whereby the phenol and the acidifying agent cause a reaction at the surface of the undissolved rubber with the formation of a resin-like rubber conversion product which removes itself from the rubber mass from which it is formed leaving fresh surfaces of rubber exposed to contact with the phenol and the acidifying substance.

3. The method of producing a rubber conversion product which comprises mixing together undissolved rubber and a phenol to form a visibly heterogeneous mixture and subjecting the mixture to heat in the presence of an acidifying isomerizing agent at a temperature above approximately 125° C. and such that the phenol is in the fluid state, the phenol covering the rubber and being present in at least 75 parts by weight to 100 parts by weight of the rubber, whereby the phenol and the acidifying agent cause a reaction at the surface of the undissolved rubber forming a resin-like rubber conversion product which removes itself from the rubber mass from which it is formed leaving fresh surfaces of rubber exposed to contact with the phenol and the acidifying substance.

4. The method of producing a rubber conversion product which comprises mixing together undissolved rubber and cresol without the aid of mastication to form a visibly heterogeneous mixture, and subjecting the mixture to heat in the presence of an acidifying isomerizing agent at a temperature above 125° C. and below the boiling point of the cresol, the cresol being present in at least 75 parts by weight to 100 parts by weight of rubber and in such amount that a substantial quantity of undissolved phenol is present in contact with the surface of the rubber mass, whereby the cresol and the acidifying agent cause a reaction at the surface of the undissolved rubber forming a resin-like rubber conversion product which dissolves in the cresol at the temperature of the reaction exposing fresh surfaces of rubber to contact with the cresol and acidifying agent.

5. The method of producing a rubber conversion product which comprises mixing together undissolved crepe rubber and a phenol without the aid of mastication to form a visibly heterogeneous mixture, and subjecting the mixture to heat in the presence of an acidifying isomerizing agent at a temperature such that the phenol is in the liquid state, the proportion of phenol to rubber being at least 75 parts by weight to 100 parts by weight and such that a substantial quantity of unabsorbed phenol exists in the liquid state in contact with the undissolved rubber whereby the phenol and the acidifying agent cause a reaction at the surface of the undissolved rubber with the formation of a resin-like rubber conversion product which removes itself from the rubber mass from which it is formed leaving fresh surfaces of rubber exposed to contact with the phenol and the acidifying subtance.

6. The method of producing a rubber conversion product which comprises mixing together undissolved crepe rubber and a phenol without the aid of mastication to form a visibly heterogeneous mixture and subjecting the mixture to heat in the presence of an acidifying isomerizing agent at a temperature above approximately 125° C. and such that the phenol is in a liquid state, the phenol covering the rubber and being present in at least approximately 75 parts by weight to 100 parts by weight of the rubber, whereby the phenol and the acidifying agent cause a reaction at the surface of the undissolved rubber forming a resin-like rubber conversion product which removes itself from the rubber mass from which it is formed leaving fresh surfaces of rubber exposed to contact with the phenol and the acidifying substance.

7. The method of producing a rubber conversion product which comprises mixing together undissolved crepe rubber and cresol without the aid of mastication to form a visibly heterogeneous mixture, and subjecting the mixture to heat in the presence of an acidifying isomerizing agent at a temperature above 125° C. and below the boiling point of the cresol, the cresol being present in at least 75 parts by weight to 100 parts by weight of rubber and in such amount that a substantial quantity of unabsorbed cresol is present in contact with the surface of the rubber mass, whereby the cresol and the acidifying agent cause a reaction at the surface of the undissolved rubber forming a resin-like rubber conversion product which dissolves in the cresol at the temperature of the reaction, exposing fresh surfaces of rubber to contact with the cresol and acidifying agent.

8. The method of producing a rubber conversion product which comprises mixing together undissolved rubber and a phenol without the aid of mastication to form a visibly heterogeneous mixture, and subjecting the mixture to heat in the presence of hydrochloric acid at a temperature such that the phenol is in the liquid state, the proportion of phenol to rubber being at least 75 parts by weight to 100 parts by weight and such that a substantial quantity of unabsorbed phenol exists in the liquid state on the surface of the undissolved rubber whereby the phenol and the hydrochloric acid cause a reaction at the surface of the undissolved rubber with the formation of a resin-like rubber conversion product which removes itself from the rubber mass from which it is formed leaving fresh surfaces of rubber exposed to contact with the phenol and the hydrochloric acid.

9. The method of producing a rubber conversion product which comprises mixing together undissolved rubber and a phenol without the aid of mastication to form a visibly heterogeneous mixture and subjecting the mixture to heat in the presence of hydrochloric acid at a temperature above approximately 125° C. and such that the phenol is in the fluid state, the phenol covering the rubber and being present in at least approximately 75 parts by weight to 100 parts by weight of the rubber, whereby the phenol and the hydrochloric acid cause a reaction at the surface of the undissolved rubber forming a resin-like rubber conversion product which removes itself from the rubber mass from which it is formed leaving fresh surfaces of rubber exposed to contact with the phenol and the hydrochloric acid.

10. The method of producing a rubber conversion product which comprises mixing together undissolved rubber and cresol without the aid of mastication to form a visibly heterogeneous mixture, and subjecting the mixture to heat in the presence of hydrochloric acid at a temperature of above approximately 125° C. and below the boiling point of the cresol, the cresol being present in at least 75 parts by weight to 100 parts by weight of rubber and in such amount that a substantial quantity of undissolved phenol is present in contact with the surface of the rubber mass, whereby the cresol and the hydrochloric acid cause a reaction at the surface of the undissolved rubber forming a resin-like rubber conversion product which dissolves in the cresol at the temperature of the reaction, exposing fresh surfaces of rubber to contact with the cresol and hydrochloric acid.

11. The method of producing a rubber conversion product which comprises mixing together undissolved crepe rubber and a phenol to form a heterogeneous mixture, and subjecting the mixture to heat in the presence of hydrochloric acid at a temperature such that the phenol is in the liquid state, the proportion of phenol to rubber being at least 75 parts by weight to 100 parts by weight and such that a substantial quantity of unabsorbed phenol exists in the liquid state in contact with the undissolved rubber whereby the phenol and the hydrochloric acid cause a reaction at the surface of the undissolved rubber with the formation of a resin-like rubber conversion product which removes itself from the rubber mass from which it is formed leaving fresh surfaces of rubber exposed to contact with the phenol and hydrochloric acid.

12. The method of producing a rubber conversion product which comprises mixing together undissolved crepe rubber and a phenol without the aid of mastication to form a visibly heterogeneous mixture and subjecting the mixture to heat in the presence of hydrochloric acid at a temperature above approximately 125° C. and such that the phenol is in a liquid state, the phenol covering the rubber and being present in at least approximately 75 parts by weight to 100 parts by weight of the rubber, whereby the phenol and the acidifying agent cause a reaction at the surface of the undissolved rubber with the formation of a resin-like rubber conversion product which removes itself from the rubber mass from which it is formed leaving fresh surfaces of rubber exposed to contact with the phenol and the hydrochloric acid.

13. The method of producing a rubber conversion product which comprises mixing together undissolved crepe rubber and cresol to form a visibly heterogeneous mixture, and subjecting the mixture to heat in the presence of hydrochloric acid at a temperature above 125° C. and below the boiling point of the cresol, the cresol being present in at least 75 parts by weight to 100 parts by weight of rubber and in such amount that a substantial quantity of undissolved phenol is present in contact with the surface of the rubber mass, whereby the cresol and the hydrochloric acid cause a reaction at the surface of the undissolved rubber with the formation of a resin-like rubber conversion product which dissolves in the cresol at the temperature of the reaction exposing fresh surfaces of rubber to contact with the cresol and hydrochloric acid.

14. The method of producing a rubber conversion product which comprises mixing together undissolved crepe rubber and cresol without the aid of mastication and subjecting the mixture to heat in the presence of an acidifying isomerizing agent incapable of reacting with the phenol at a temperature above approximately 125° C. and below the boiling point of the cresol, the cresol being present in at least 75 parts by weight to 100 parts by weight of rubber and in such amount that a substantial quantity of unabsorbed phenol is present in contact with the surface of the rubber mass, whereby the cresol and the acidifying agent cause a reaction at the surface of the undissolved rubber forming a resin-like rubber conversion product which dissolves in the cresol at the temperature of the reaction exposing fresh surfaces of rubber to contact with the cresol and acidifying agent.

15. The method of producing a rubber conversion product which comprises mixing together undissolved crepe rubber and cresol without the aid of mastication to form a visibly heterogeneous mixture, and subjecting the mixture to heat in the presence of aluminum chloride at a temperature above approximately 125° C. and below the boiling point of the cresol, the cresol being present in at least 75 parts by weight to 100 parts by weight of rubber and in such amount that a substantial quantity of unabsorbed phenol is present in contact with the surface of the rubber mass, whereby the cresol and the aluminum chloride cause a reaction at the surface of the undissolved rubber forming a resin-like rubber conversion product which dissolves in the cresol at the temperature of the reaction exposing fresh surfaces of rubber to contact with the cresol and aluminum chloride.

16. The process of preparing in a relatively short period of time a light-colored resin-like rubber isomer adapted for producing low viscosity solutions in gasoline which comprises subjecting a mixture consisting of undissolved crepe rubber and hydrochloric acid in a bath of cresol, the cresol being present in at least 75 parts by weight to 100 parts by weight of rubber to heat at near the boiling point of the cresol for sufficient time as to produce a colloidal dispersion of the rubber conversion product in the cresol, and extracting the cresol and acid from the conversion product to isolate the conversion product.

17. The process of producing a rubber conversion product which comprises reacting rubber in the form of a mass selected from thin sheets and powder in a bath of a phenol, the phenol being present in at least 75 parts by weight to 100 parts by weight of rubber.

JAMES P. McKENZIE.